United States Patent [19]

Wiggenhauser

[11] Patent Number: 4,619,150
[45] Date of Patent: Oct. 28, 1986

[54] SLIDING GEAR FOR SPEED-CHANGING TRANSMISSION

[75] Inventor: Pedro Wiggenhauser, Hagnau, Fed. Rep. of Germany

[73] Assignee: Zahnradfabrik Friedrichshafen Aktiengesellschaft, Friedrichshafen, Fed. Rep. of Germany

[21] Appl. No.: 767,241

[22] Filed: Aug. 19, 1985

Related U.S. Application Data

[63] Continuation of Ser. No. 652,145, Sep. 17, 1984, abandoned, which is a continuation of Ser. No. 249,692, Mar. 31, 1981, abandoned.

[30] Foreign Application Priority Data

Apr. 2, 1980 [DE] Fed. Rep. of Germany ....... 3012778

[51] Int. Cl.⁴ ............................ F16H 3/04; F16H 3/38; F16H 57/00
[52] U.S. Cl. ......................................... 74/332; 74/460; 74/457; 74/339; 29/59.7
[58] Field of Search ................... 74/332, 339, 457, 458, 74/462, 460, 410; 72/108; 29/159.2

[56] References Cited

U.S. PATENT DOCUMENTS

| | | | |
|---|---|---|---|
| 2,311,740 | 2/1943 | Dodge | 74/339 |
| 2,320,757 | 6/1943 | Sinclair et al. | 74/339 |
| 2,753,725 | 7/1956 | De Vlieg | 29/159.2 |
| 2,846,038 | 8/1958 | Brownyer | 74/339 |

FOREIGN PATENT DOCUMENTS

| | | |
|---|---|---|
| 1767638 | 5/1958 | Fed. Rep. of Germany . |
| 2757739 | 12/1977 | Fed. Rep. of Germany . |
| 160524 | 4/1932 | Switzerland . |
| 758641 | 10/1956 | United Kingdom . |

OTHER PUBLICATIONS

H. Loos, "Erfahrungen beim Zahnrad-Rollen", published in *Werkstatt und Betrieb*, 1974, No. 2, pp. 65–71 (West Germany).

Primary Examiner—Kenneth J. Dorner
Assistant Examiner—Michael D. Bednarek
Attorney, Agent, or Firm—Karl F. Ross; Herbert Dubno

[57] ABSTRACT

A sliding gear for a speed-changing transmission, idling on an output shaft, has a set of external running teeth in permanent mesh with a driving gear and a set of internal clutch teeth engageable with mating teeth on a coupling member carried by that shaft. The two sets of teeth have centerlines inclined to the axial direction by angles so related as to exert balanced axial forces upon the sliding gear in the engaged position of the latter. The clutch teeth have flanks diverging from their centerlines at small angles, in the direction of the engagement shift, to hold the sliding gear in contact with the coupling member.

3 Claims, 3 Drawing Figures

SLIDING GEAR FOR SPEED-CHANGING TRANSMISSION

This is a continuation of co-pending application Ser. No. 652,145 filed on Sept. 17, 1984, now abandoned, which is a continuation of co-pending application Ser. No. 249,692 filed on Mar. 31, 1981, now abandoned.

FIELD OF THE INVENTION

My present invention relates to a sliding gear having two sets of peripheral teeth, namely running teeth in permanent mesh with a driving member and clutch teeth selectively engageable with a driven member of a speed-changing transmission.

BACKGROUND OF THE INVENTION

Conventional sliding gears of speed-changing transmissions, having straight clutch teeth on an end face, are mainly used for shifting into reverse. For reasons of convenience in cases where the driving member is a jack shaft, even in transmissions with otherwise obliquely toothed gears, the idler gear of the first forward speed ratio also has straight (i.e. axially extending) teeth. If, in order to obtain a larger number of forward speed ratios, a main or basic transmission unit is connected in cascade with a range or group transmission unit so that the first speed ratio is also used, for example, as a 5th ratio, it is convenient for various reasons to provide the first-ratio and reverse gears also with inclined teeth. On account of the relatively high axial forces in the case of inclined running teeth, it is a very expensive matter to lock the sliding gear in such transmissions. The generally practiced back-angling of the clutch teeth must give rise to a considerable restraining force, which is achieved to the detriment of ready shiftability. Moreover, this solution is not reliable in at least one loading direction (pulling or pushing), so that such relatively simple sliding gears are not normally utilized. Obliquely toothed gears of the kind specified are therefore mounted rotatable but axially fixed on the output shaft, for example, and gear shifting is performed via a sliding sleeve by engagement of a coupling member with the clutch teeth of such gears. This arrangement is substantially more expensive to construct and less compact in the axial direction.

OBJECT OF THE INVENTION

It is therefore the object of my present invention to provide such a sliding gear with an improved set of clutch teeth enabling that gear to be operated easily and reliably while preventing its spontaneous disengagement, in either loading direction, from the coacting teeth of the associated coupling member.

SUMMARY OF THE INVENTION

This object is achieved, in accordance with my present invention, by so inclining the centerlines of the running teeth and the clutch teeth on the sliding gear with reference to its axial direction that angles $\beta_L$ and $\beta_K$ of the same sign, respectively included between these centerlines and the axial direction, satisfy the relationship $$\beta_K = \arctan(r_K/r_L \tan \beta_L), \quad (1)$$

where $r_L$ and $r_K$ are the effective radii of the running and clutch teeth, respectively, whereby the axial forces acting upon the two sets of teeth cancel each other out.

Moreover, the flanks of the clutch teeth diverge from their centerlines, in the direction of the engagement shift of the sliding gear, by small back angles tending to hold this gear in contact with the associated coupling member.

These back angles advantageously lie in a range of $\pm 1.5°$ to $6°$ whereby even in the most unfavorable cases, namely when for reasons of tolerance or wear some residual axial forces are still generated by a rocking movement, reliable interlocking of the engaged clutch teeth is assured. In that case there is no need for additional engagement-maintaining measures which would have an adverse effect on the shiftability of the assembly.

BRIEF DESCRIPTION OF THE DRAWING

The above and other features of my invention will now be described with reference to the accompanying drawing wherein.

SPECIFIC DESCRIPTION

Figure 1:
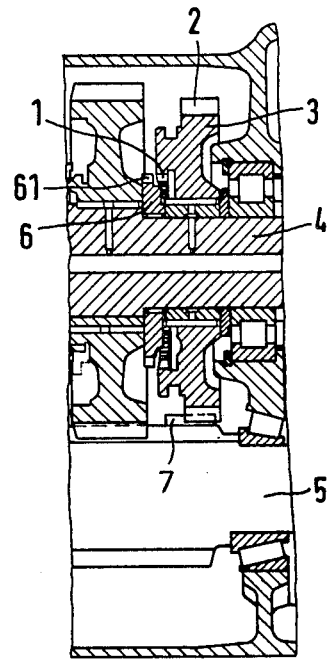
FIG. 1 is an axial sectional view of a sliding gear and an associated coupling member in a speed-changing transmission embodying my invention.

FIG. 1 shows a sliding gear 3, in this case a reversing gear, which idles on an output shaft 4 and is continuously driven by a jack shaft 5 via an intermediate gear 7 in permanent mesh with its external running teeth 2. A driving connection between the output shaft 4 and gear train 7, 3 is achievable via a coupling member 6 which is mounted on that output shaft. To drive the shaft 4 in reverse, the sliding gear 3 must therefore be moved to the left in this example so that a set of internal clutch teeth 1 thereof can engage with mating teeth 61 of the coupling member 6.

Figure 2:
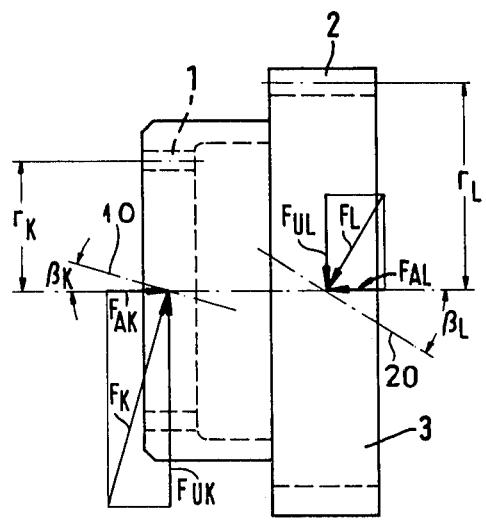
FIG. 2 is a diagrammatic view of the forces acting upon the running and clutch teeth of the sliding gear in one loading condition.

FIG. 2 shows diagrammatically the orientation of running teeth 2, disposed on an outer peripheral surface of gear 3, and clutch teeth 1, disposed on an inner peripheral surface thereof, relative to its axis. The centerlines 20 of the running teeth 2 are inclined to the axial direction at an acute angle $\beta_L$, the centerlines 10 of clutch teeth 1 being inclined to that direction at a somewhat smaller acute angle $\beta_K$ of the same sign. The radii of the clutch and running teeth have been designated $r_K$ and $r_L$, respectively. The forces acting on these teeth with the transmission operating under positive load (push) have the references $F_L$ for the running teeth and $F_K$ for the clutch teeth; these forces have respective peripheral and axial components $F_{UL}$, $F_{AL}$ and $F_{UK}$, $F_{AK}$. The codirectional inclination of the running and clutch teeth therefore results in balanced axial forces $|F_{AL}| = |F_{AK}|$ if the angles $\beta_L$ and $\beta_K$ are related by the aforestated equation (1).

Figure 3:
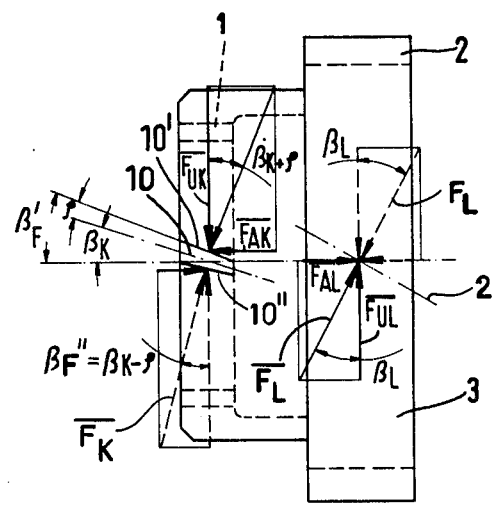
FIG. 3 is a similar diagram relating to the opposite loading condition.

As illustrated in FIG. 3, the clutch teeth 1 of gear 3 have flanks 10', 10'' diverging from their centerlines 10 by back angles $p < \beta_K$ to include with the axial direction respective angles of inclination $\beta_F' = \beta_K + p$ and $\beta_F'' = \beta_K - p$ of the same sign.

The forces $F_L$, $F_K$ etc. indicated in FIG. 2, relating to operation under push, have been shown in FIG. 3 in dotted lines while their inverted counterparts $\overline{F_L}$, $\overline{F_K}$ with components $\overline{F_{UL}}$, $\overline{F_{AL}}$ and $\overline{F_{UK}}$, $\overline{F_{AK}}$, relating to operation under negative load (pull), are shown in full lines.

The following numerical example illustrates the determination of the angle of inclination $\beta_K$ of the clutch teeth 1 on the basis of angle $\beta_L$ and radii $r_L$, $r_K$. With angle $\beta_L = 12°$ and the effective engagement diameter of running teeth 2 equal to 201.724 mm ($r_L = 100.86$ mm), and with the corresponding diameter of clutch teeth 1 equal to 131.3 mm ($r_K = 65.65$ mm), equation (1) yields $$\beta_K = \arctan\,(65.65/100.86\,\tan\,12°) = 7.877°.$$

This angle of inclination of clutch teeth 1 ensures a precise balancing of the axial forces in the present example. The back angle $\rho$ selected in this instance equals 2.8°, whence the two flank angles are given by $$\beta_F' = \beta_K + \rho = 10.68° \text{ and}$$

$$\beta_F'' = \beta_K - \rho = 5.08°.$$

The parameters on which this selection is based include, for example, the following conditions:
manufacturing tolerances,
permissible estimated wear,
smooth shiftability,
width of the clutch teeth.

This, for example, with relatively narrow clutch teeth, the angle $\rho$ ought to be large. Let $$F_{AR} = F_{UL}(\tan\,\beta_L - r_L/r_K \tan\,\beta_F) \quad (2)$$

be the resulting axial force in terms of the peripheral force $F_{UL}$ of the running teeth 1. The ratio $F_{AR}/F_{UL}$ can be determined for both pulling and pushing operation by substituting the values of $\beta_F'$ and $\beta_F''$ for $\beta_F$ in equation (2), as follows:

$$F_{AR}'(\text{pulling}) = F_{UL}(\tan\,12° - 100.86/65.65\,\tan\,10.68°) = 0.077\,F_{UL}$$

whence $F_{AR}'/F_{UL} \approx 7.7\%$ $$F_{AR}''(\text{pushing}) = F_{UL}(\tan\,12° - 100.86/65.65\,\tan\,5.08°) = 0.076\,F_{UL}$$

whence $F_{AR}''/F_{UL} \approx 7.6\%$.

In both instances the axial force draws the loose gear 3 toward the coupling member 6.

I claim:

1. In a speed-changing transmission including a driving gear, an output shaft arranged for rotation in a first sense under the action of said driving gear, a sliding gear freely rotatably and axially displaceably mounted on said output shaft and having a set of peripheral running teeth which extend substantially radially outwardly of said sliding gear and are in permanent mesh with said driving gear, said sliding gear being further provided with a set of peripheral first clutch teeth and a coupling member fixedly mounted on said output shaft and having a set of peripheral second clutch teeth adapted to be in meshing engagement with said first clutch teeth upon an axial shift of said sliding gear along said output shaft into an engagement position in which said output shaft is rotated by said driving gear in a second sense opposite to said first sense through the intermediary of said sliding gear and said coupling member;

the improvement comprising said first clutch teeth extend between a pair of axially spaced annular surfaces formed on a sleeve constituting part of said sliding gear and into which said coupling member fits and said first clutch teeth project substantially radially inwardly of said sliding gear, said second clutch teeth extend between a pair of axially spaced faces of a disk forming said coupling member and project substantially radially outwardly of said coupling member, said first clutch teeth being formed within said sleeve, and said running teeth and said first clutch teeth have respective centerlines including with the axial direction of said sliding gear respective acute angles of inclination $\beta_L$ and $\beta_K$ substantially satisfying the expression $$\beta_K = \arctan\,(r_K/r_L \tan\,\beta_L)$$

where $r_K$ and $r_L$ are the effective radii of said first clutch teeth and said running teeth, respectively, and said acute angles of inclination are of the same sign, whereby axial forces exerted under load upon said running teeth and upon said first clutch teeth in said engagement position of said sliding gear substantially cancel each other under both "push" and "pull" operating conditions in both senses of rotation of said output shaft, each of said first clutch teeth further having its flanks diverging by back angles $\rho < \beta_K$ of opposite signs from the center line of that first clutch tooth in the direction of said axial shift of said sliding gear into said engagement position of the latter, thereby to maintain said first clutch teeth securely engaged with said second clutch teeth, said flanks including with the centerlines of said clutch teeth back angles of opposite signs ranging between 1.5° and 6°.

2. A speed-changing transmission as defined in claim 1 wherein said driving gear and said sliding gear are part of a reversing gear train driven by a jack shaft paralleling said output shaft.

3. A speed-changing transmission as defined in claim 1 wherein said driving gear and said sliding gear are part of a reversing gear train driven by a jack shaft paralleling said output shaft.

* * * * *